(12) United States Patent
Kitazawa et al.

(10) Patent No.: US 8,976,978 B2
(45) Date of Patent: Mar. 10, 2015

(54) SOUND SIGNAL PROCESSING APPARATUS AND SOUND SIGNAL PROCESSING METHOD

(75) Inventors: Yuji Kitazawa, Saitama (JP); Kohei Asada, Kanagawa (JP); Yasunobu Murata, Tokyo (JP); Tetsunori Itabashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 845 days.

(21) Appl. No.: 13/115,233

(22) Filed: May 25, 2011

(65) Prior Publication Data

US 2011/0293107 A1 Dec. 1, 2011

(30) Foreign Application Priority Data

Jun. 1, 2010 (JP) ................................ 2010-125502

(51) Int. Cl.
*H04R 3/00* (2006.01)
*G01S 3/808* (2006.01)
*G01S 3/86* (2006.01)
*H04R 1/10* (2006.01)
*H04R 5/033* (2006.01)

(52) U.S. Cl.
CPC .................. *G01S 3/8083* (2013.01); *G01S 3/86* (2013.01); *H04R 1/1083* (2013.01); *H04R 5/033* (2013.01); *H04R 2430/03* (2013.01)
USPC ......................................................... 381/92

(58) Field of Classification Search
USPC .......................................................... 381/92
See application file for complete search history.

(56) References Cited

U.S. PATENT DOCUMENTS

| 5,539,859 | A | 7/1996 | Robbe et al. |
|---|---|---|---|
| 2004/0252852 | A1 | 12/2004 | Taenzer |
| 2007/0098181 | A1 | 5/2007 | Noguchi et al. |
| 2009/0323976 | A1 | 12/2009 | Asada et al. |
| 2011/0249824 | A1 | 10/2011 | Asada et al. |
| 2011/0293102 | A1 | 12/2011 | Kitazawa et al. |
| 2014/0050327 | A1 | 2/2014 | Asada et al. |

FOREIGN PATENT DOCUMENTS

| JP | 2007-129383 A | 5/2007 |
|---|---|---|
| JP | 2010-011117 A | 1/2010 |

OTHER PUBLICATIONS

European Office Action issued May 10, 2012 in connection with European Application No. 11167170.7.
U.S. Appl. No. 14/062,639, filed Oct. 24, 2013, Asada et al.

*Primary Examiner* — Davetta W Goins
*Assistant Examiner* — Daniel Sellers
(74) *Attorney, Agent, or Firm* — Wolf, Greenfield & Sacks, P.C.

(57) ABSTRACT

A sound signal processing apparatus includes a sound source direction determination unit and a filter processing unit. The sound source direction determination unit determines sound source directions with respect to sound signals of a plurality of channels for respective first to n-th bands. The filter processing unit includes first to n-th filters which are connected in series and configured to boost or attenuate the sound signals with respect to the first to n-th bands. The respective first to n-th filters perform boosting or attenuation based on the sound source directions of the first to n-th bands which are determined by the sound source direction determination unit.

4 Claims, 12 Drawing Sheets

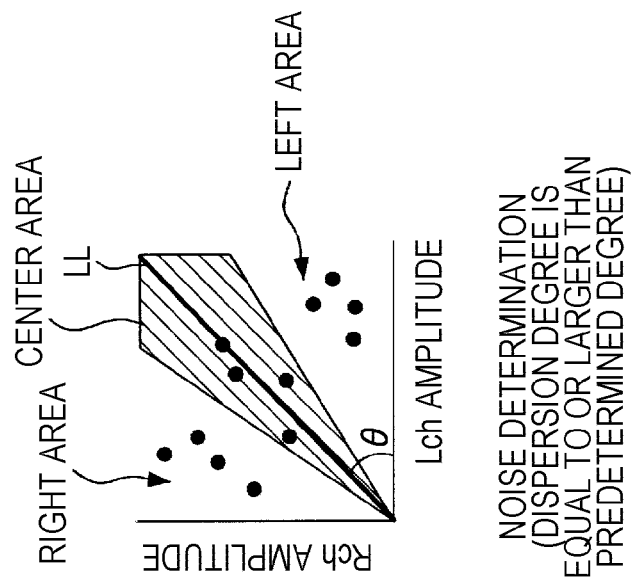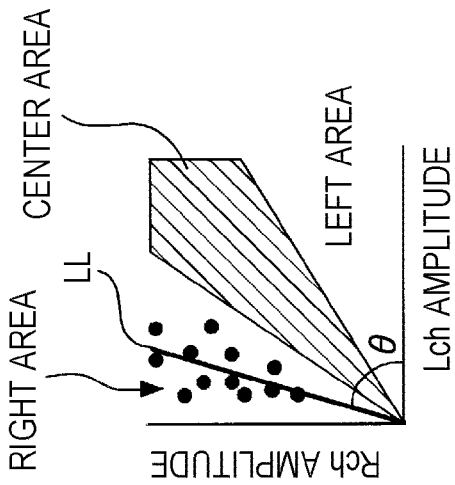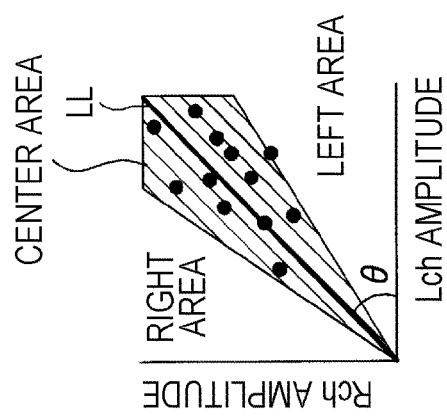

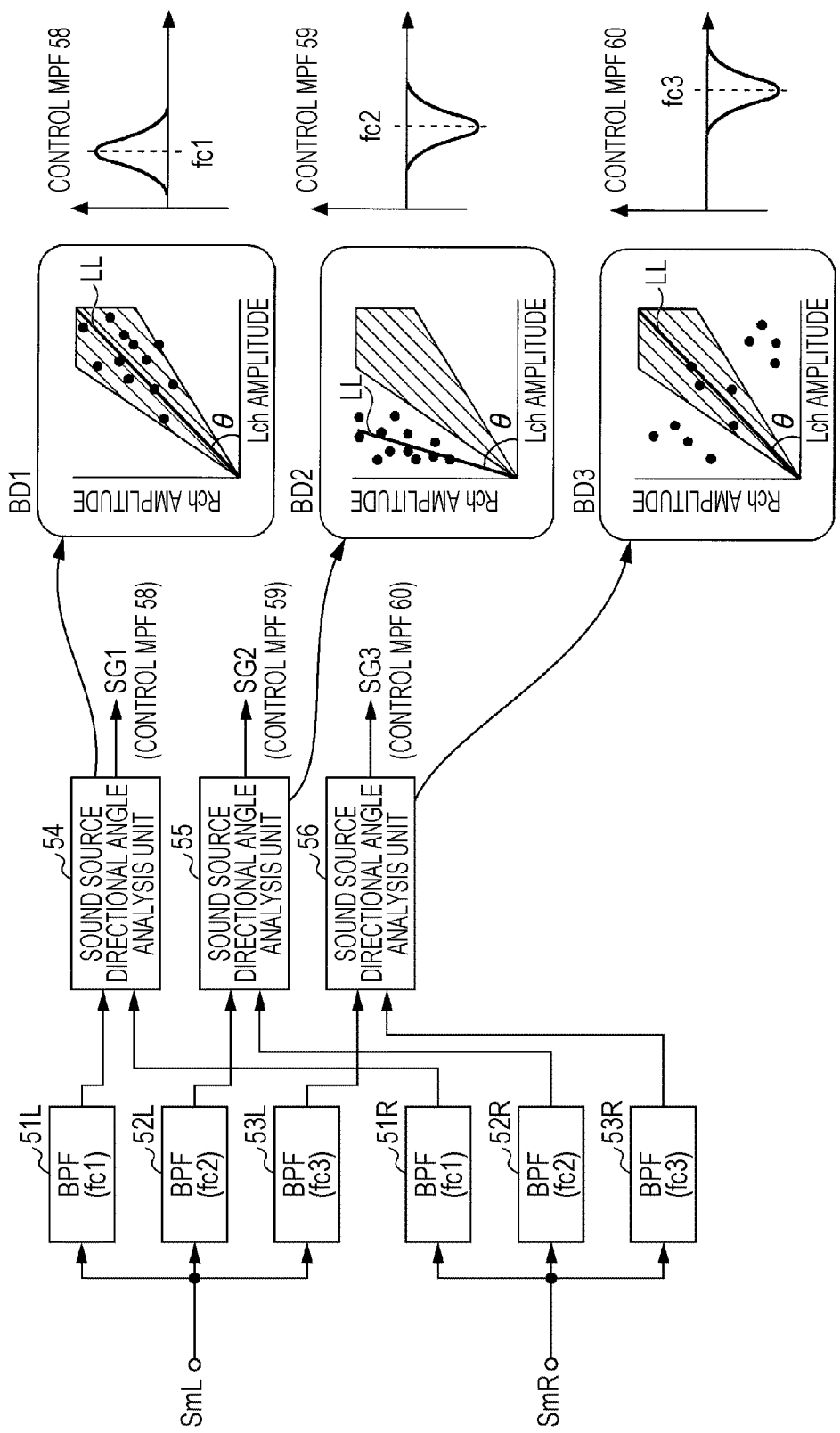

PRIOR ART

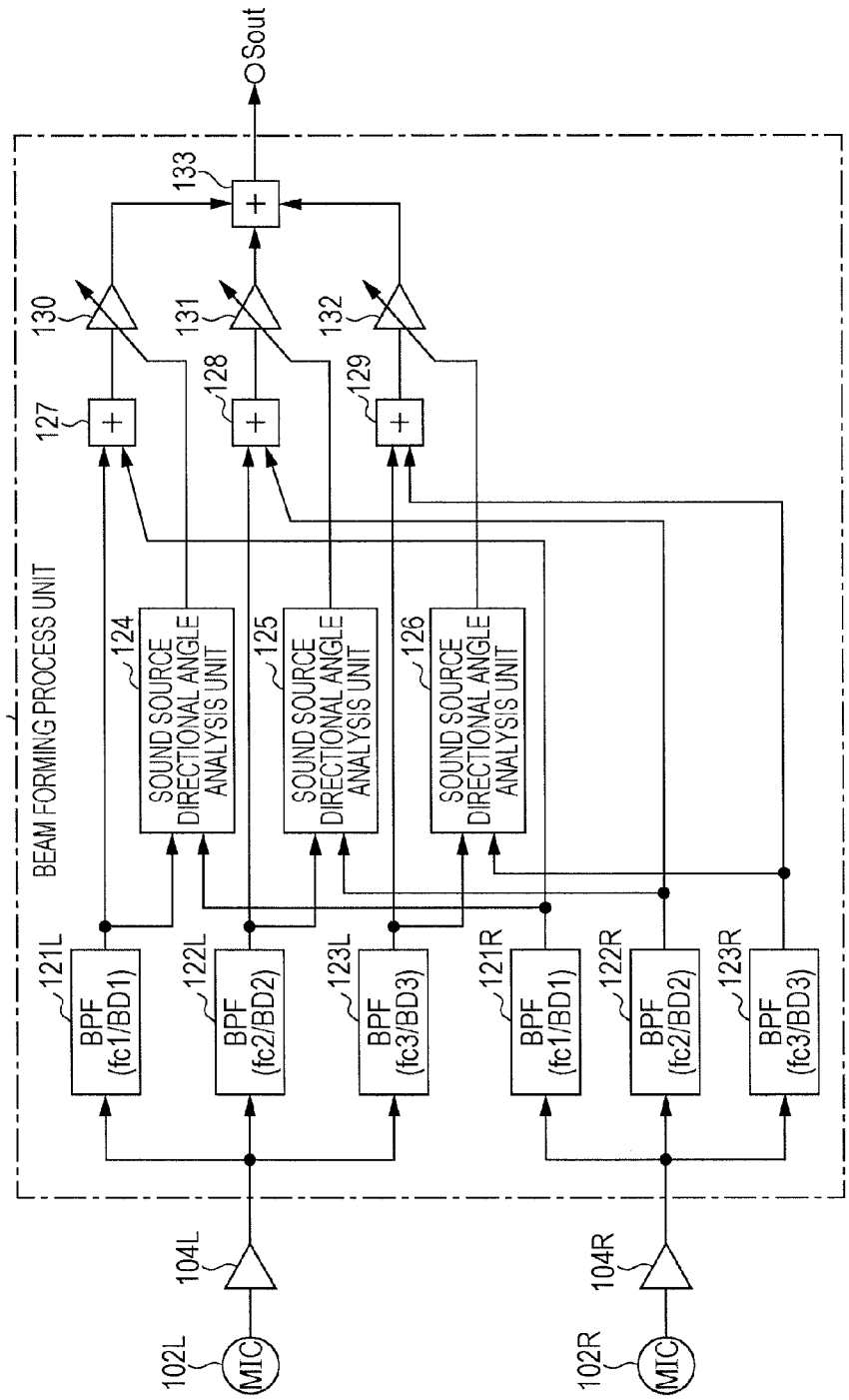

SOUND SIGNAL PROCESSING APPARATUS AND SOUND SIGNAL PROCESSING METHOD

BACKGROUND

The present disclosure relates to a sound signal processing apparatus and a sound signal processing method for obtaining a sound from a specific sound source direction.

Japanese Unexamined Patent Application Publication No. 2010-11117 and Japanese Unexamined Patent Application Publication No. 2007-129383 are examples of related art.

For example, a beam forming technique for forming directivity with respect to input sounds from two microphones is known.

FIG. 10 illustrates an example of a noise cancellation headphone (hereinafter, referred to as an NC headphone). Although an NC headphone 100 supplies stereo sounds to a user using left and right speakers 101L and 101R, microphones 102L and 102R that absorb external sounds are provided in order to reduce external noises.

The NC headphone 100, for example, reproduces and outputs the sounds of reproduction music from a portable media player or the like.

In brief, in order to cancel noises, reversed phase components of sound signals absorbed by the microphones 102L and 102R are generated, combined with respective music signals, and then output from the speakers 101L and 101R. Therefore, the sounds of the music signals are listened to by a user in a state in which external noises are spatially cancelled.

Here, it is considered that the microphones 102L and 102R are used not only for canceling noise but also for absorbing external sounds which have directivity.

For example, although it is preferable that a user can normally perform conversation or the like even when wearing the NC headphone 100, if a noise cancellation function is turned on, for example, even the sounds of a person who is in front of the user are reduced, so that it is difficult to listen to conversational sounds.

Therefore, for example, when a conversation or the like is performed, a mode that turns off reproduction music and turns off a noise cancellation function is provided.

However, if the noise cancellation function is turned off, surrounding noise is heard to a large degree together with the sounds of other people. Therefore, in a place where there is much traffic, the inside of a plane, or the like, a state in which conversational sounds or the like are difficult to be heard is not changed.

In such a case, it is preferable that a speaker output, in which conversational sounds are easily heard and surrounding noises are suppressed, can be realized.

If it is considered that a user wears the NC headphone 100 and faces the front as in FIG. 10, it can be considered that the sounds of a target that conducts conversation come from the front of the user in most cases. At this time, as shown in FIG. 10, when viewed from the user, the user regards sound sources other than from the front as noises, of which the level thereof should be lowered while boosting the conversational sounds from the front.

In order to realize this, when a necessary sound source direction is temporarily set to the front, directivity can be formed at the time of absorbing sounds using a so-called beam forming method.

FIG. 11A is a conceptual diagram illustrating a beam forming process, and sound signals from left and right microphones 102L and 102R are processed and output by a beam forming process unit 103.

The simplest beam forming process may be a process of adding sound signals from the left and right microphones 102L and 102R as shown in FIG. 11B when the necessary directivity is the front or the back.

In this case, the phases of the sound signal components of left and right channels with respect to sounds from the front or back, that is, sounds from the sound sources at an equal distance from the microphones 102L and 102R, are matched with each other, and boosted by addition. Since the phases of the sound signal components of sounds from other directions are deviated from the phases of the sound signal components of the left and right channels, the sound signal components are reduced by as much as the deviation. Therefore, sound signals having, for example, directivity in the front direction can be obtained.

Meanwhile, the beam forming process itself can boost the sound signals in the directions other than the front direction. In this case, a delay unit is installed on one side channel, with the result that the time difference between the same wave fronts which reach each of the microphones can be absorbed, so that the beam forming can be realized in an oblique direction or in a traverse direction.

In order to increase the accuracy of the beam forming (in this case, the same meaning as the boosting of the front directivity and the reduction in surrounding noises), a noise suppression device that mainly uses band pass filters shown in FIG. 12 is generally used and not the simple device as shown in FIG. 11B.

The sound signal obtained by the microphone 102L is amplified by the microphone amplifier 104L, and then supplied to band pass filters 121L, 122L, and 123L that have central pass frequencies fc1, fc2, and fc3, respectively. In the band pass filters 121L, 122L, and 123L, the sound signal components of the bands BD1, BD2, and BD3 are extracted.

Further, the sound signal obtained by the microphone 102R is amplified by the microphone amplifier 104R, and then supplied to band pass filters 121R, 122R, and 123R that have central pass frequencies fc1, fc2, and fc3, respectively, so that the sound signal components of the respective bands BD1, BD2, and BD3 are extracted.

Meanwhile, the pass band of the band pass filter that has the central frequency fc1 is represented as a band BD1. In the same manner, the pass bands of the band pass filters that have the central frequencies fc2 and fc3 are represented as bands BD2 and BD3.

The sound signal components of the band BD1, which are the outputs of the band pass filters 121L and 121R, are supplied to the sound source directional angle analysis unit 124 and the adder 127.

The sound signal components of the band BD2, which are the output of the band pass filters 122L and 122R, are supplied to the sound source directional angle analysis unit 125 and the adder 128.

The sound signal components of the band BD3, which are the outputs of the band pass filters 123L and 123R, are supplied to the sound source directional angle analysis unit 126 and the adder 129.

The sound source directional angle analysis units 124, 125, and 126 determine the sound source direction of a dominant sound from among the sound signal components of the bands BD1, BD2, and BD3, respectively.

Thereafter, the sound source directional angle analysis units 124, 125, and 126 control the gain of the variable gain amplifiers 130, 131, and 132 based on the determined direction. That is, the sound source directional angle analysis units 124, 125, and 126 perform control such that the gain increases when the determined direction is a target direction, such as the front direction or the like, and such that the gain decrease when the determined direction is the other direction.

Each of the sound signal components of the bands BD1, BD2, and BD3 is added by the adders 127, 123, and 129 for the respective L and R channels, and then supplied to the variable gain amplifiers 130, 131, and 132. Thereafter, the variable gain amplifiers 130, 131, and 132 are controlled by the sound source directional angle analysis units 124, 125, and 126 as described above, so that, for example, a band in which the sound from the front direction is dominant is boosted, and the other bands are reduced. The outputs of the respective bands BD1, BD2, and BD3 in which gains are adjusted as weights for respective bands are added by an adder 133, and become an output sound signal Sout on which a beam forming process has been performed.

When a beam forming process unit 103 using such a noise suppression device is used, the conversation sounds are not easily buried in noises and can be heard in the state as shown in FIG. 10.

Further, as one type of method of boosting sounds and suppressing noises, a method using an FFT that centers on "spectrum subtraction" may be provided as a representative method of analyzing and combining sounds without using the beam forming method in order to remove noises in the related art.

SUMMARY

As described above, as the representative method of analyzing and combining sounds in order to reduce noises in the related art, two methods that use band pass filters and FFTs respectively are provided.

The method using FFTs has some disadvantages. The first is that the calculation amount is enormous, and the second is that peculiar noise sounds which cause uncomfortable feeling termed musical noises are generated.

On the other hand, in the method using band pass filters as shown in FIG. 12, the calculation amount can be suppressed to be small and musical noises are not generated in principle. Further, there is an advantage in that variation in the quality and quantity of the process can be processed without making large changes.

As one reason behind this, since FFT can treat only the sample number of $2^n$, for example, the calculation amount is discrete and is not increased by a small amount because there is a calculation resource. On the other hand, with respect to band pass filters, since a single band pass filter has a small unit of calculation amount, there are advantages in that the number of bands is easily increased and decreased and can be set in detail according to the calculation resource. Therefore, it is considered that the method using band pass filters is preferable.

However, in the method using band pass filters, there is a problem in that sound quality is decreased compared with before the process is performed.

When sounds are generally analyzed and combined using band pass filters, a method of analyzing the sound data of each of the bands divided by band pass filters, performing a process on the sound data of each of the bands in parallel, and finally combining all the sound data is used.

In a method of analyzing and combining sounds using band pass filters as shown in FIG. 12, sound quality is better than the case of FFTs. However, phase rotation is controlled and adjusted according to band pass filters, addition/non-addition is controlled and adjusted according to bands, or increase/decrease in a level is controlled and adjusted. Therefore, when addition is performed for the respective bands, phases may not be matched compared to the original sound source, so that sound quality deterioration felt as noises is undeniable and becomes a problem.

It is desirable to provide a signal processing method (noise suppression method based on beam forming) for reducing noises while maintaining sound quality with respect to sound signals obtained from a plurality of microphones, thereby improving calculation processing efficiency.

A sound signal processing apparatus according to an embodiment of the disclosure includes a sound source direction determination unit that determines sound source directions with respect to sound signals of a plurality of channels, which can be obtained by, for example, a plurality of microphone inputs or line inputs, for respective first to n-th bands; and a filter processing unit that includes first to n-th filters which are connected in series and configured to boost or attenuate the sound signals with respect to the first to n-th bands. The respective first to n-th filters perform boosting or attenuation based on the sound source directions of the first to n-th bands which are determined by the sound source direction determination unit.

Further, the sound source direction determination unit may include first to n-th sound source directional angle analysis units corresponding to the first to n-th bands. Each of the first to n-th sound source directional angle analysis units may have one-to-one correspondence with each of the first to n-th filters and regards the corresponding filters as control targets for a boosting or attenuating process. Each of the first to n-th sound source directional angle analysis units may allow the filter to be controlled to perform the boosting process when a sound source direction of a corresponding band is determined as a direction included in a predetermined angle range, and allow the filter to be controlled to perform the attenuating process when a sound source direction angle of the corresponding band is not determined as a direction included in the predetermined angle range.

Further, each of the first to n-th sound source directional angle analysis units may allow the filter to be controlled to perform the attenuating process when the sound source direction is determined be in a dispersion state.

Further, each of the first to n-th sound source directional angle analysis units may determine the sound source direction with respect to the corresponding band based on energy subtraction of the sound signals of the respective channels.

Further, each of the first to n-th filters of the filter processing unit, which are connected in series, may receive a sound signal with which the sound signals of the plurality of channels are combined.

Further, each of the first to n-th filters, which are connected in series, of the filter processing unit may receive a sound signal of one of the plurality of channels.

A sound signal processing method according to another embodiment of the disclosure may include determining sound source directions with respect to sound signals of a plurality of channels for respective first to n-th bands; and inputting sound signals to first to n-th filters which are connected in series and configured to boost or attenuate the sound signals with respect to the first to n-th bands, and performing boosting or attenuation by the respective first to n-th filters based on the sound source directions of the first to n-th bands, which are determined in the determining of the sound source directions.

The above-described disclosure is a signal processing method (a noise suppression method based on beam forming) for reducing noises while maintaining sound qualities of the apparatus which use two or more microphones, thereby improving calculation processing efficiency.

In order to remedy the deterioration in sound qualities accompanied by a noise reduction method, sound signals obtained by a single or two or more separated microphones are divided for a respective plurality of bands, and analysis (sound source direction determination) is performed to determine noises for the respective bands.

Thereafter, one or a plurality of additional values of the input sound signals are processed based on the analysis results of the sound source direction using a group of filters arranged in series on a time axis on which the mismatch of phases does not occur, thereby reducing noises.

The group of filters connected in series includes a plurality of band boosting or attenuation filters capable of controlling gains, and the filters are controlled based on the analysis results.

According to the disclosure, the sound signal process of reducing noises while maintaining sound qualities with respect to sound signals obtained from a plurality of microphones, thereby improving calculation processing efficiency, can be realized.

BRIEF DESCRIPTION OF THE DRAWINGS

FIGS. 4A to 4C are explanatory views of the sound source direction determination according to the embodiment;

FIG. 5 is an explanatory view of MPF control based on the sound source direction determination according to the embodiment;

FIG. 12 is a block diagram of a noise suppression device according to the related art.

DETAILED DESCRIPTION OF EMBODIMENTS

Hereinafter, embodiments of the disclosure will be described in the following order.
1. Noise suppression device according to Embodiment
2. Example applied to NC headphone
3. Examples applied to Various Kinds of Apparatus and Modified Example
1. Noise Suppression Device According to Embodiment
FIG. 1 shows a noise suppression device 1 as an embodiment of a sound signal processing apparatus of the disclosure.

The noise suppression device 1 obtains sound signals which are preferable to a conversation in a noise environment in such a way that sound signals absorbed by the left and right microphones 2L and 2R are input, and sounds from, for example, the front (or the back), are boosted, and sounds from the other directions are attenuated.

Figure 1:
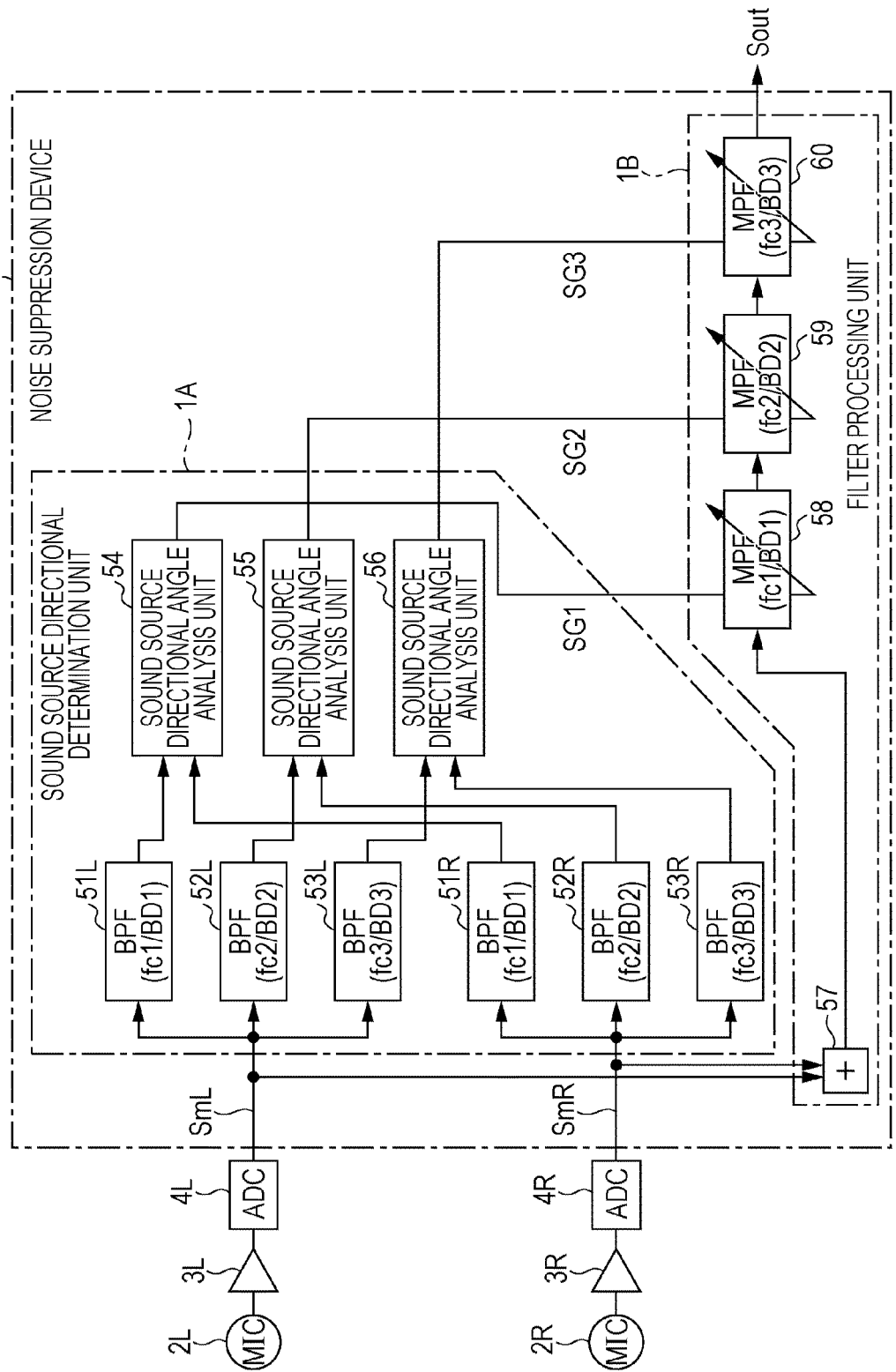
FIG. 1 is a block diagram of a noise suppression device according to an embodiment of the disclosure.

In FIG. 1, a sound signal SmL obtained by the microphone 2L is amplified by the microphone amplifier 3L, and is converted to digital data by an Analog-to-Digital (A/D) converter 4L. Thereafter, the sound signal SmL which is converted to the digital data is input to the noise suppression device 1.

Further, a sound signal SmR obtained by the microphone 2R is amplified by the microphone amplifier 3R, and is converted to digital data by an A/D converter 4R. Thereafter, the sound signal SmR which is converted to the digital data is input to the noise suppression device 1.

The noise suppression device 1 is configured to include a sound source direction determination unit 1A and a filter processing unit 1B.

The sound source direction determination unit 1A determines the sound source directions of the sound signals SmL and SmR of L and R channels for respective first to third bands in this example.

The filter processing unit 1B includes first to third filters (MPFs 58, 59, and 60 which will be described later) that are configured to boost or attenuate the sound signals for the respective first to third bands and are connected to each other in series.

The sound source direction determination unit 1A includes band pass filters 51L, 52L, 53L, 51R, 52R and 53R, and sound source directional angle analysis units 54, 55, and 56.

The central pass frequencies of the respective band pass filters 51L, 52L, and 53L are set to fc1, fc2, and fc3. For the explanation, the respective pass bands are represented as BD1, BD2, and BD3.

Further, the central pass frequencies of the respective band pass filters 51R, 52R, and 53R are set to central pass frequencies fc1, fc2, and fc3. The respective pass bands are represented as BD1, BD2, and BD3 in the same manner.

The sound signal SmL of the left channel is input to the band pass filters 51L, 52L, and 53L, and the sound signal components of the respective bands BD1, BD2, and BD3 are extracted.

Further, the sound signal SmR of the right channel is input to the band pass filters 51R, 52R, and 53R, and the sound signal components of the respective bands BD1, BD2, and BD3 are extracted.

The sound signal components of the band BD1 of each of the left and right channels, which are the outputs of the band pass filters 51L and 51R, are provided to the sound source directional angle analysis unit 54.

The sound signal components of the band BD2 of each of the left and right channels, which are the outputs of the band pass filters 52L and 52R, are provided to the sound source directional angle analysis unit 55.

The sound signal components of the band BD3 of each of the left and right channels, which are the outputs of the band pass filters 53L and 53R, are provided to the sound source directional angle analysis unit 56.

The sound source directional angle analysis unit 54 corresponds to the band BD1, and determines the sound source direction of a dominant sound from among the supplied sound signal components of the band BD1.

The sound source directional angle analysis unit 55 corresponds to the band BD2, and determines the sound source direction of a dominant sound from among the supplied sound signal components of the band BD2.

The sound source directional angle analysis unit 56 corresponds to the band BD3, and determines the sound source direction of a dominant sound from among the supplied sound signal components of the band BD3.

Although a method of determining the sound source directions by the sound source directional angle analysis units 54, 55, and 56 will be described later, each of the sound source directional angle analysis units 54, 55, and 56 determines the sound source direction based on the energy subtraction of the sound signals of the respective channels with respect to the corresponding bands.

Thereafter, the sound source directional angle analysis units 54, 55, and 56 control Mid Presence Filters (MPFs) 58, 59, and 60, which are provided to has one-to-one correspondence with the sound source directional angle analysis units 54, 55, and 56, using control signals SG1, SG2, and SG3 according to the determined directions. As can be understood from the drawing, an MPF 58 serves as a control target of the sound source directional angle analysis unit 54, an MPF 59 serves as a control target of the sound source directional angle analysis unit 55, and an MPF 60 serves as a control target of the sound source directional angle analysis unit 56, respectively.

The filter processing unit 1B includes an adder 57, and MPFs 58, 59, and 60. The MPFs 58, 59, and 60 serve as a series-connected filter group.

An adder 57 adds the sound signals SmL and SmR of the left and right channels. A sound signal (LR addition signal), in which the sound signals of the left and right channels are combined by the adder 57, is supplied to the MPF 58.

The MPFs 58, 59, and 60 boost or attenuate the corresponding bands, respectively. Here, the reason why three MPFs are provided is that the band pass filters 51L, 52L, 53L, 51R, 52R, and 53R of the sound source direction determination unit 1A divide each of the sound signals SmL and SmR into three bands.

Figure 2:
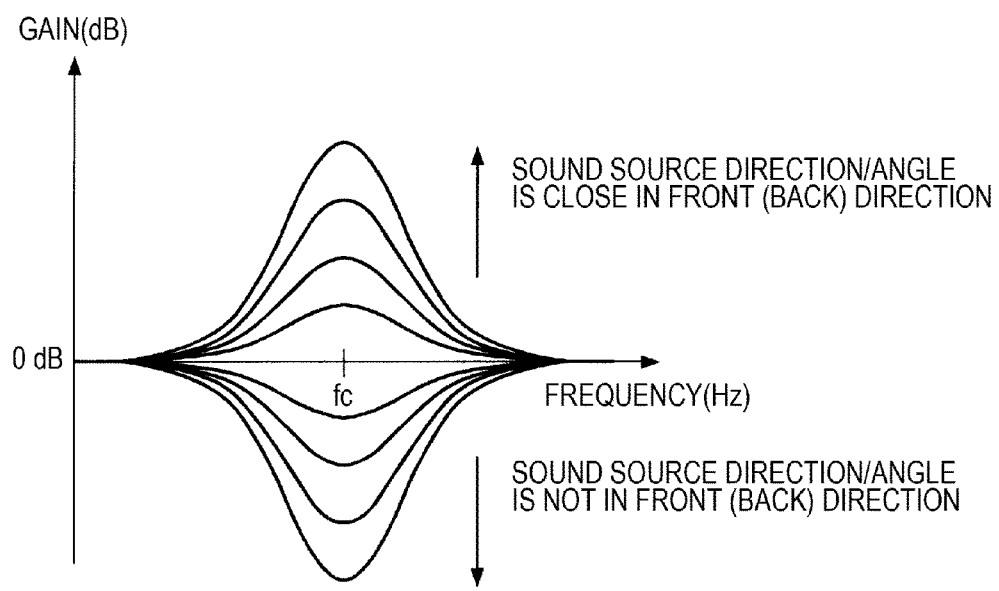
FIG. 2 is an explanatory view of MPF characteristics according to the embodiment.

The central pass frequencies of the respective MPFs 58, 59, and 60 are set to fc1, fc2, and fc3. Further, each of the MPFs 58, 59, and 60 has characteristics as shown in FIG. 2, and performs amplification and reduction of gain with respect to a specific target band (a band centering on a frequency fc). The boosting and attenuation of a target band attributable to such variable gain adjustment in the MPFs 58, 59, and 60 are controlled by the sound source directional angle analysis units 54, 55, and 56, as described above.

That is, although the MPF 58 boosts and attenuates the band BD1 which centers on the frequency fc1, the MPF 58 corresponds to the band pass filters 51L and 51R and the sound source directional angle analysis unit 54.

Further, although the MPF 59 boosts and attenuates the band BD2 which centers on the frequency fc2, the MPF 59 corresponds to the band pass filters 52L and 52R and the sound source directional angle analysis unit 55.

Further, although the MPF 60 boosts and attenuates the band BD3 which centers on the frequency fc3, the MPF 60 corresponds to the band pass filters 53L and 53R and the sound source directional angle analysis unit 56.

Thereafter, when the noise suppression device 1 sets a front (back) direction as a target direction, a band in which a sound source direction is determined as the front (back) direction is boosted, and a band in which the sound source direction is determined as another direction is attenuated. A boosting/attenuation level is based on the determination of a directional angle.

In the respective MPFs 58, 59, and 60, the sound signal (LR addition signal) is boosted or attenuated based on the control by the sound source directional angle analysis units 54, 55, and 56. Thereafter, the output of the MPF 60 is the output signal Sout of the noise suppression device 1.

The determination process of the sound source directional angle analysis units 54, 55, and 56 and the control with respect to the MPFs 58, 59, 60 will be described.

Figure 3:
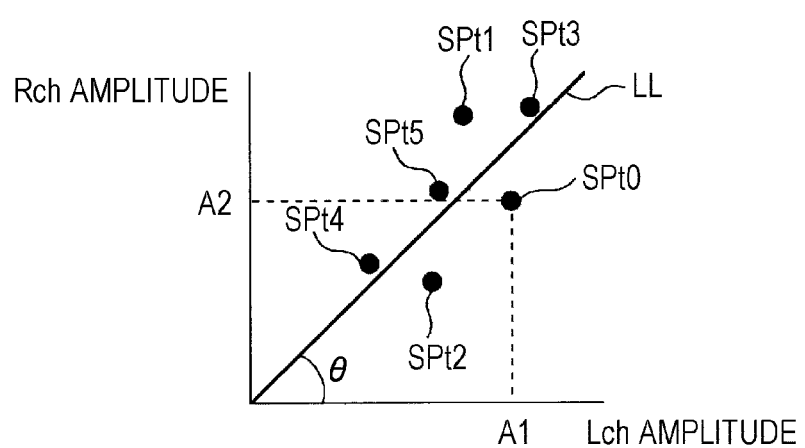
FIG. 3 is an explanatory view of sample plots at the time of sound source direction determination according to the embodiment.

FIG. 3 shows the plots of sample values at the time of the sound source direction/angle determination performed by the sound source directional angle analysis units 54, 55, and 56.

Although the components of the bands BD1, BD2, and BD3 of the sound signals SmL and SmR are input to the respective sound source directional angle analysis units 54, 55, and 56, the sound source directional angle analysis units 54, 55, and 56 plot the amplitude values of the respective L and R channels.

The plot locations on the LR plane of FIG. 3 represent the energy subtraction of the sound signals SmL and SmR of the respective L and R channels.

First, the absolute values of the amplitude values of the L/R channels of a target band are plotted on the LR plane of FIG. 3, and this process is repeated during a specific time period.

For example, as an input value at a certain time point t0, if it is assumed that the absolute value of the amplitude of the L channel is set to A1 and the absolute value of the amplitude of the R channel is set to A2, the input value is plotted as a sample SPt0 represented as the black circle. This process is sequentially performed on each of the time points t1, t2, ..., and samples SPt1, SPt2, ... are plotted as shown in the drawing.

If a plurality of samples SPs are plotted during a certain unit time (for example, determined as about 0.5 to 5 seconds), a straight line LL starting from an original point is obtained using a least-squares method. That is, a straight line in which the sum of the squares of the distance from all the samples SPs becomes minimum, and the straight line is set to the straight line LL.

The angle θ of the straight line LL is regarded as the angle of the sound source direction.

With respect to the sound signal of a certain band, when an angle θ (straight line LL) comes around the center of the LR plane (around 45° in the drawing), it can be considered that the difference in the amplitude values in the corresponding band is small and it can be considered that the sound source is equidistant from the right and left. That is, the front direction can be estimated as the sound source direction.

On the other hand, when the angle θ (straight line LL) is inclined to the longitudinal axis or inclined to the lateral axis of the LR plane, it can be considered that the difference in the right and left amplitude values of the sound of the band is large and it can be considered that the sound from the right direction side or the left direction side.

Here, for example, as shown as oblique line sections in FIGS. 4A to 4C, the area of the angle θ in which the straight line LL exists around 45° is regarded as a center area. The center area is an area in which the sound source direction is regarded as the front (or back). On the other hand, a right area and a left area in the drawing correspond to areas in which the sound source directions are regarded as the right side and the left side, respectively. In FIGS. 4A to 4C, black circles are the plot points of the sample SPs.

Figure 10:
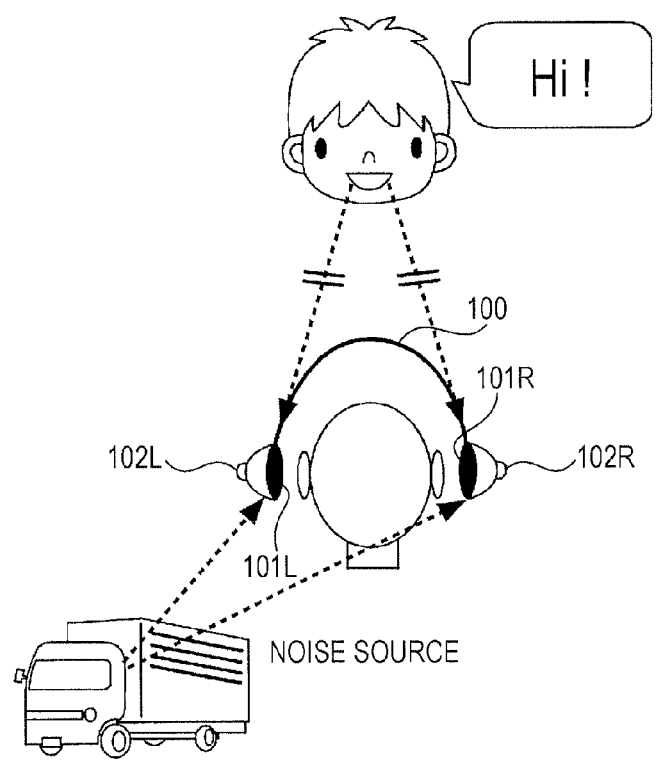
FIG. 10 is an explanatory view of a conversation state in noisy conditions.
Figure 11B:
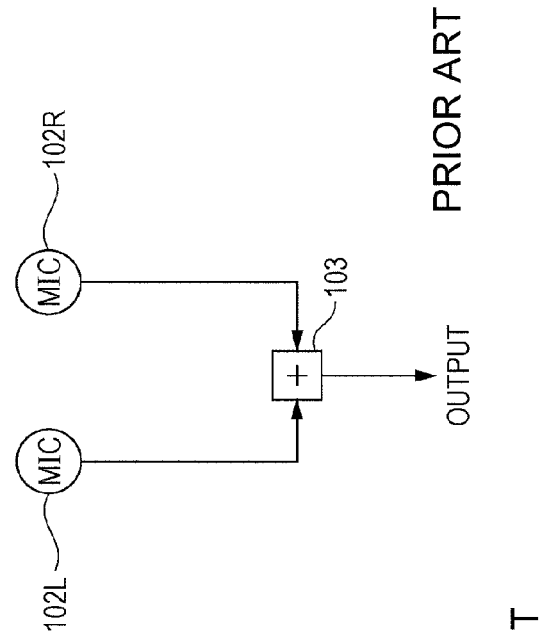
FIGS. 11A and 11B are explanatory views of a beam forming process.
Figure 11A:
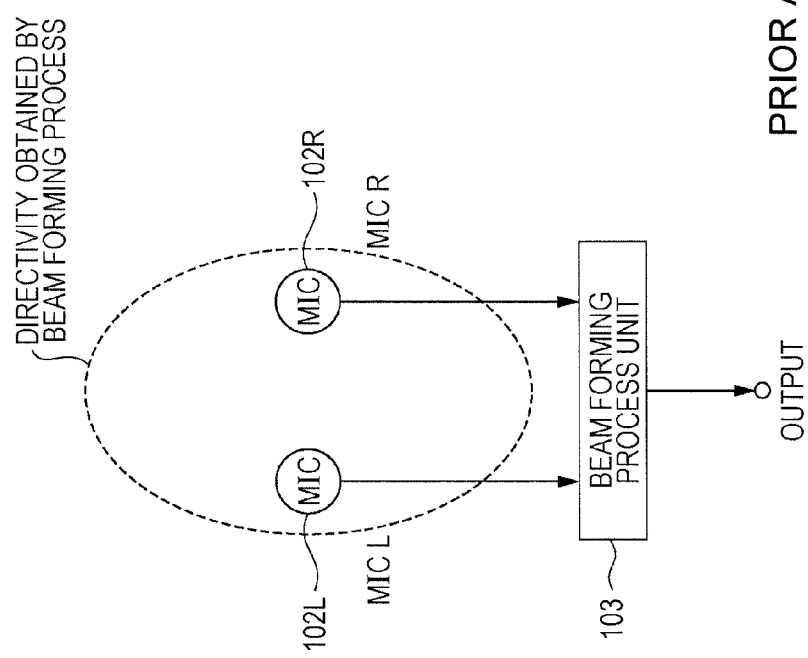

For example, when the state described with reference to FIG. 10 is considered, the sound source direction of a conversational sound from another person can be considered as a front direction. In this case, the sound signal component of bands in which the sound source direction is the front direction can be estimated as, for example, the conversational sound, that is, the sound which a user wants to hear. On the other hand, the sound signal component of bands in which the sound source direction is another direction can be estimated as a noise sound, that is, the sound signal component desired to be reduced.

In this case, when the angle θ exists within the range of the center area on the LR plane as shown in FIG. 4A, the band is determined as a conversational sound (voice sound).

Further, as shown in FIG. 4B, when the angle θ exists in the area other than the center area, that is, a right area (or a left area), on the LR plane, the probability of the sound being from the front is low, and the sound of the band is determined as a noise sound.

Meanwhile, there is a case in which the sound should be determined as a noise even when the angle θ exists in the center area. When the sample points are broadly dispersed on the LR plane as shown in FIG. 4C, the straight line LL according to the least-squares method becomes a slope around 45° and the angle θ is included in the center area.

The case where the dispersion degree is high as described above is the case where noise sounds arrive widely from many or all directions attributable to surrounding reflected sounds. For example, the case corresponds to a case where sounds, including reflected sounds as in the cabin of an airplane, are heard from all the directions.

Here, when the dispersion degree is equal to or higher than a predetermined degree, the sound of the band is determined as a noise even when the angle θ is included in the center area.

As a specific example, if the sum of squares of a distance when the straight line LL is obtained using a least squares method is equal to or greater than a specific threshold, it can be determined that the dispersion degree is large. The reason for this is that the sum of squares of the distances from the respective samples SPs to the straight line LL becomes small when the plotted dots of samples are concentrated in the center area, and the sum of squares becomes large in the case shown in FIG. 4C.

FIG. 5 shows an example of the control of each of the sound source directional angle analysis units 54, 55, and 56.

Here, when the sound source directional angle analysis unit 54 performs the above-described analysis on the band BD1, the angle θ of the straight line LL is included in the center area. Although the sound source directional angle analysis unit 54 controls the MPF 58 using the control signal SG1 as described above, in this case, the sound of the band BD1 is determined as a target sound in this case, so that the band BD1 which centers on the frequency fc1 is boosted by the MPF 58 as shown in the drawing.

Further, when the sound source directional angle analysis unit 55 performs the above-described analysis on the band BD2, the angle θ of the straight line LL is in an area other than the center area. Although the sound source directional angle analysis unit 55 controls the MPF 59 using the control signal SG2, the sound of the band BD2 is determined as a noise in this case, so that the band BD2 which centers on the frequency fc2 is attenuated by the MPF 59 as shown in the drawing.

Further, when the sound source directional angle analysis unit 56 performs the above-described analysis on the band BD3, the angle θ of the straight line LL is included in the center area. However, since the dispersion degree of the sample dots becomes equal to or greater than a predetermined degree, the sound of the band BD3 is determined as a noise. Although the sound source directional angle analysis unit 56 controls the MPF 60 using the control signal SG3, the sound of the band BD3 is determined as a noise in this case, so that the band BD3 which centers on the frequency fc3 is attenuated by the MPF 60 as shown in the drawing.

The filter characteristics of the MPFs 58, 59, and 60 are variably controlled based on the above-described determination of the sound source direction for the respective bands, so that the output signal Sout processed by the MPFs 58, 59, and 60 becomes a sound signal in which a sound from the front is boosted and the other noise is attenuated.

Figure 6:
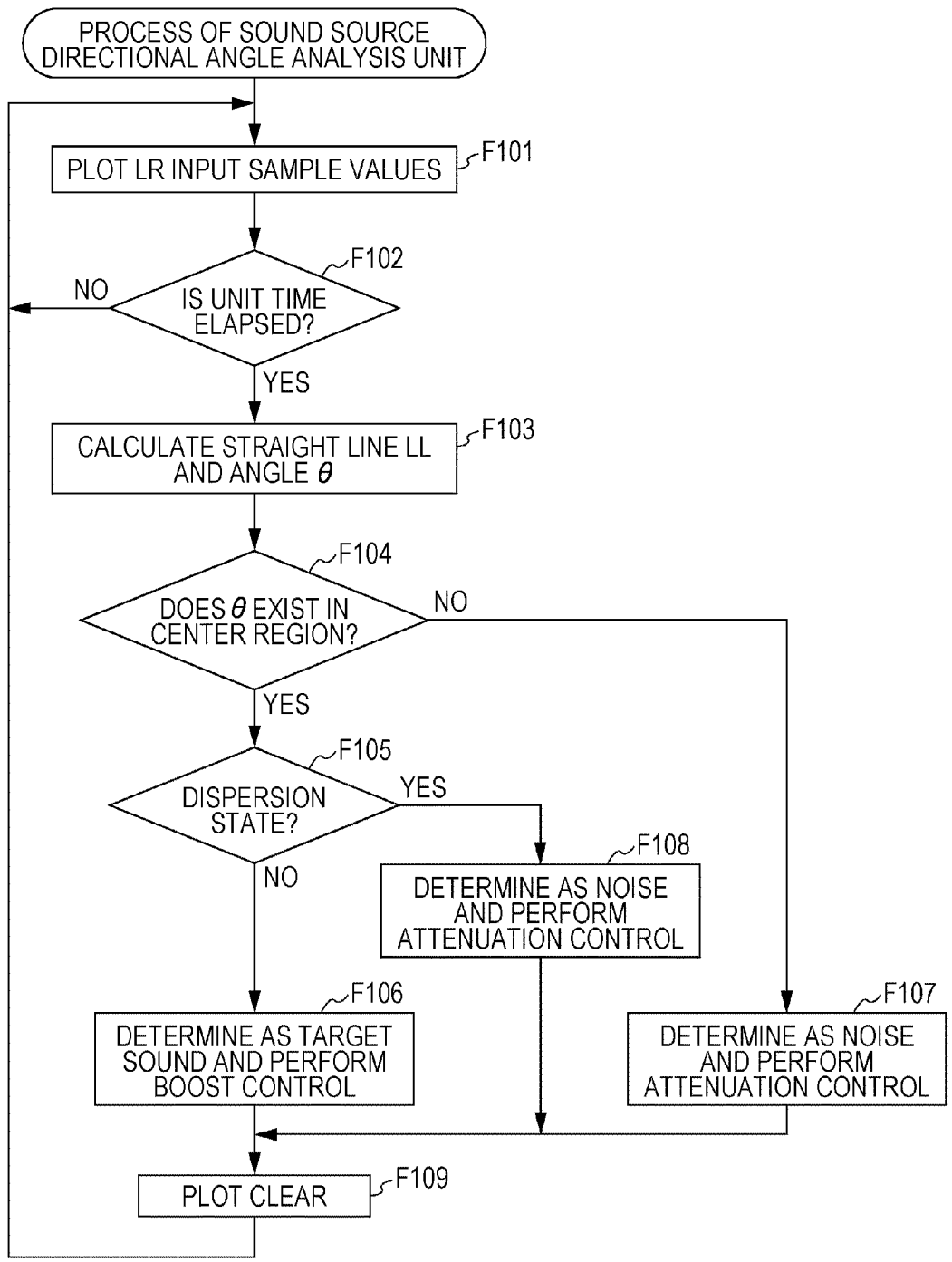
FIG. 6 is a flowchart of a process performed by a sound source directional angle analysis unit according to the embodiment.

The processes of the above-described sound source directional angle analysis units 54, 55, and 56 are performed as shown in FIG. 6. The process of the sound source directional angle analysis unit 54 will be described.

First, the sound source directional angle analysis unit 54 plots the input values of the sound signals SmL and SmR of the band BD1 to be input on the above-described LR plane during a specific unit time in steps F101 and F102.

After plotting a plurality of sample dots during the unit time, the sound source directional angle analysis unit 54 proceeds to step F103, obtains a straight line LL using a least-squares method, and then obtains the angle θ of the straight line LL.

In step F104, it is first determined whether the angle θ is included in the center area or not. If the angle θ is not included in the center area, the sound source directional angle analysis unit 54 proceeds to step F107, and then determines that the sound of the corresponding band BD1 is a noise. Thereafter, the sound source directional angle analysis unit 54 allows the MPF 58 to perform an attenuation process on the band BD1 using the control signal SG1.

Meanwhile, it can be considered that the amount of the attenuation in this case becomes, for example, the amount of the attenuation according to the difference between the angle θ at this time and the central angle (for example, 45° of the center area.

On the other hand, if it is determined that the angle θ is included in the center area in step F104, the sound source directional angle analysis unit 54 proceeds to step F105 and determines whether the dispersion state is equal to or greater than a specific level. As described above, it may be determined whether the sum of squares of the distance between each of the samples and the straight line LL is equal to or greater than a specific threshold.

When the dispersion state is equal to or greater than the specific value, the sound source directional angle analysis unit 54 proceeds to step F108, and determines that the sound of the corresponding band BD1 is a noise. Thereafter, the sound source directional angle analysis unit 54 allows the MPF 58 to perform the attenuation process on the band BD1 using the control signal SG1.

Meanwhile, the amount of attenuation in this case can be considered as, for example, the amount of attenuation based on the value of the sum of squares of the distance.

When it is determined that the angle θ is included in the center area and the dispersion state is not equal to or greater than the specific value, the sound source directional angle analysis unit 54 proceeds to step F106, and determines that the sound of the corresponding band BD1 is a target sound. Thereafter, the sound source directional angle analysis unit 54 allows the MPF 58 to perform a boosting process on the band BD1 using the control signal SG1.

Meanwhile, the amount of boosting in this case can be considered as, for example, the amount of boosting based on the difference between the angle θ at this time and the central angle (for example, 45°) of the center area and based on the dispersion degree.

That is, the amount of boosting is greater as the angle θ becomes closer to 45°, and the amount of boosting is greater as the dispersion degree becomes smaller.

When any control is performed in steps F106, F107, and F108, the sound source directional angle analysis unit 54 clears the plotted samples in step F109, and then returns to step F101 and performs plotting during the unit time again. Thereafter, the same process is repeated.

The sound source directional angle analysis unit 54 repeatedly and continuously performs the above-described process. The sound source directional angle analysis unit 55 and 56 perform the same process.

Therefore, for each unit time, the sound source direction of each band is determined and the MPFs 58, 59, and 60 control filter characteristics based on the determination.

As understood from the above description, the noise suppression device 1 in the present example divides the input sound signals SmL and SmR into bands BD1, BD2, and BD3 using the band pass filters 51L, 52L, 53L, 51R, 52R, and 53R. Thereafter, analysis is performed to determine whether the sound signals are noises or not for the respective bands BD1, BD2, and BD3 using the sound source directional angle analysis units 54, 55, and 56. On the other hand, the sound signals SmL and SmR are added and supplied to the MPFs 58, 59, and 60 which are connected in series. The filter characteristic of each of the MPFs 58, 59, and 60 is variably controlled based on the determination results of the sound source directional angle analysis units 54, 55, and 56.

In this case, the control of a sound stream is a serial filter process and has the same system as a so-called equalizer. Therefore, the deterioration in sound quality due to phase mismatch generated in the above-described configuration of FIG. 12 does not occur in principle. Therefore, the output signal Sout which has no deterioration in sound quality can be obtained.

Further, since an FFT process is not used, the amount of calculation can be suppressed to be low.

Further, the band pass filters can be scalably designed according to the amount of resources to be used. It is difficult to be realized in a process which uses FFTs.

In addition, the whole system can be mounted with little delay, and can be applied to a field, in particular, to voice communication or the like, which requests an extremely rapid response.

2. Example Applied to NC Headphone

An example in which the noise suppression device 1 according to the above-described embodiment is applied to a noise cancellation headphone 10 will be described.

Figure 7:
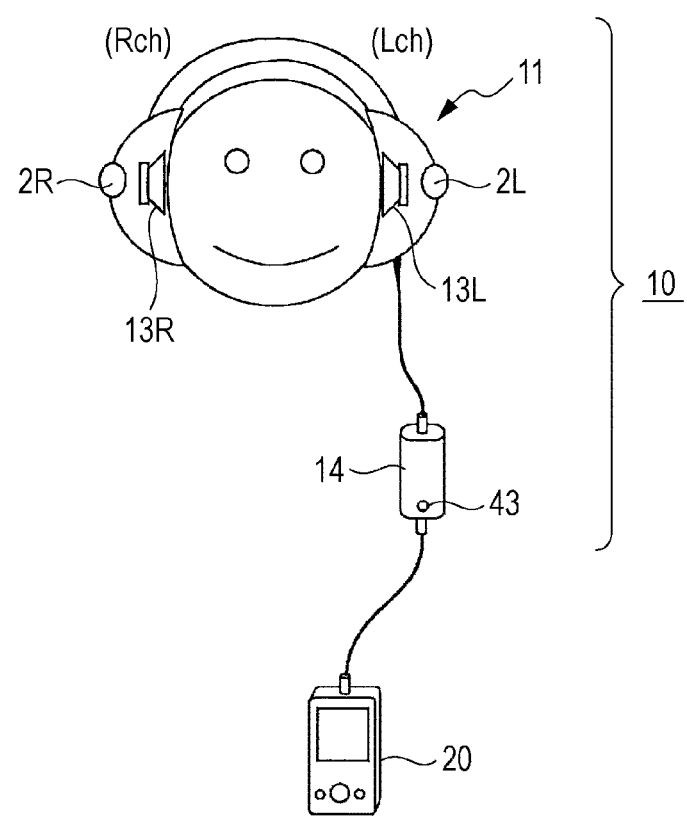
FIG. 7 is an explanatory view of an example applied to an NC headphone according to the embodiment.

FIG. 7 schematically shows the noise cancellation headphone (NC headphone) 10 used while being connected to a music reproduction device such as a portable media player 20 or the like.

The media player 20 reproduces data, such as music or the like, recorded in an internal recording medium, and outputs sound signals of two L and R channels to the connected NC headphone 10.

The NC headphone 10 includes a headphone unit 11 and a noise cancellation unit 14.

The headphone unit 11 includes the speakers 13L and 13R of the L and R channels in respective speaker housings corresponding to both left and right ears of a user.

In the case of this example, a noise cancellation process according to a so-called feedforward method is performed, and microphones 2L and 2R are provided to collect the external sounds of the respective left and right speaker housings.

Meanwhile, the headphone unit 11 may not be the type having the speaker housing as shown in the drawing but may be the types such as an earphone type or an ear pad type. In the case of the present example, the microphones 2L and 2R may be provided in any case.

The noise cancellation unit 14 is connected to the headphone unit 11 to which the microphones 2L and 2R are provided as described above. A monitor switch 43 is provided in the noise cancellation unit 14, so that a user can perform the on/off operation of a monitor mode.

Meanwhile, the monitor mode referred to here is a mode that enables a conversational sound or the like to be successfully heard while the output of music or the like which is being reproduced in the media player 20 is stopped and the noise cancellation function is turned on.

The noise cancellation unit 14 mixes a sound signal, such as reproduction music or the like, supplied from the media player 20 with a noise reduction sound signal, so that the sound signal from which the external noises are reduced is output from the speakers 13L and 13R.

Briefly speaking, noise reduction is performed as follows.

The microphones 2L and 2R mounted on the speaker housing collect an external noise which reaches the ears of a user through the speaker housing. The noise cancellation unit 14 generates a noise reduction sound signal which has an acoustically reserved phase with respect to that of the external noise based on the sound signal of the external noise collected by the microphones 2L and 2R. Thereafter, the noise cancellation unit 14 combines the generated noise reduction sound signal with the sound signal, such as reproduction music or the like, and then supplies the resulting signal to the speakers 13L and 13R.

Therefore, since the reserved phase component of the external noise is included in the sound output from the speakers 13L and 13R, the reserved phase component and the external noise actually leaked through the speaker housing spatially are balanced out, so that the external noise component is reduced and the output sound of the original reproduction music reaches the sense of hearing of the user.

Figure 8:
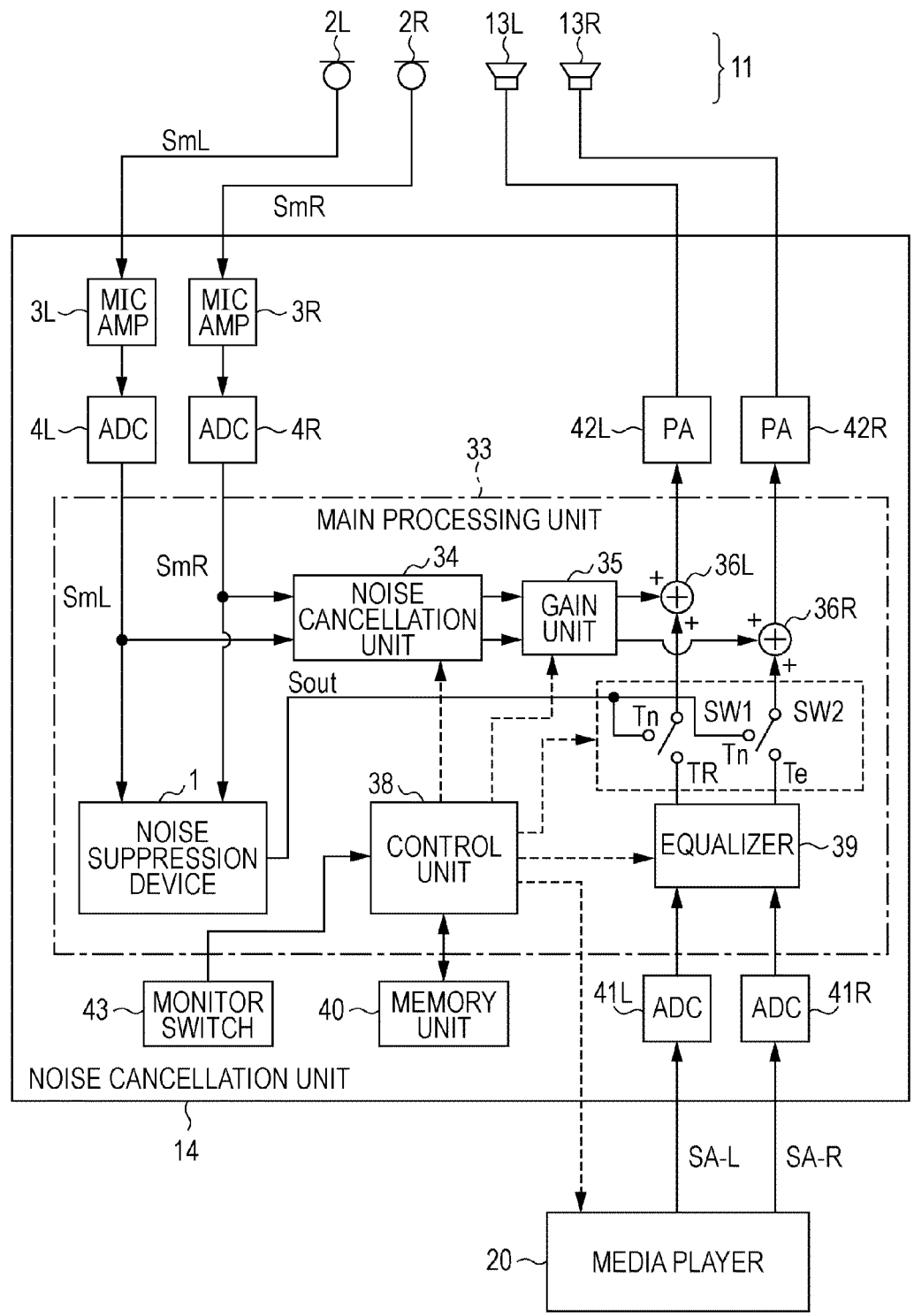
FIG. 8 is a block diagram of the NC headphone according to the embodiment.

The internal configuration of the noise cancellation unit 14 is shown in FIG. 8.

The noise cancellation unit 14 includes microphone amplifiers 3L and 3R, A/D converters 4L and 4R, a main processing unit 33 based on a DSP or a CPU, a memory unit 40, power amplifiers 42L and 42R, A/D converters 41L and 41R, and a monitor switch 43.

In the main processing unit 33, a noise cancellation unit 34, a gain unit 35, adders 36L and 36R, a noise suppression device 1, a control unit 38, an equalizer 39, and switches SW1 and SW2 are provided.

First, a sound signal, such as reproduction music or the like, from the media player 20 is processed as follows.

The reproduction sound signals SA-L and SA-R of the L and R channels are supplied from the media player 20 as a so-called headphone output.

The reproduction sound signals SA-L and SA-R are converted into digital signals by the A/D converters 41L and 41R. Thereafter, the equalizer 39 performs sound quality correction such as amplitude-frequency characteristic correction, phase-frequency characteristic correction, or both corrections.

The correction process of the equalizer 39 is performed based on a control signal from the control unit 38. For example, the indication of a frequency characteristic or the like is performed using the control signal.

The reproduction sound signals SA-L and SA-R in which the sound qualities thereof are corrected by the equalizer 39 are respectively provided to the adders 36L and 36R through the switches SW1 and SW2 connected to a Te terminal. Thereafter, the reproduction sound signals SA-L and SA-R are added to noise reduction sound signals by the adders 36L and 36R, and then the resulting signals are supplied to the power amplifiers 42L and 42R.

The power amplifiers 42L and 42R may be configured with digital amplifiers, and may be configured with a D/A converter and an analog amplifier.

Further, the output from the power amplifiers 42L and 42R serve as driving signals corresponding to the speakers 13L and 13R, and sounds are output from the speakers 13L and 13R based on the reproduction sound signals SA-L and SA-R.

On the other hand, a process for the above-described noise cancellation is performed as follows.

The sound signals SmL and SmR collected by the microphones 2L and 2R are amplified by the microphone amplifiers 3L and 3R of the noise cancellation unit 14, and then converted into digital signals by the A/D converters 4L and 4R.

The sound signals SmL and SmR which are converted into the digital signals and output from the A/D converters 4L and 4R are supplied to the noise cancellation unit 34. The noise cancellation unit 34 serves as a digital filter that generates the above-described noise reduction sound signals using the feedforward method. The noise cancellation unit 34 performs a filtering process on the respective sound signals SmL and SmR using a filter coefficient as instructed by the control signal from the control unit 38, and then generates the noise reduction sound signals of the L and R channels.

The generated noise reduction sound signals of the L and R channels are supplied to the gain unit 35. The gain unit 35 assigns gains corresponding to the noise reduction sound signals of the L and R channels using the gain coefficient as instructed by the control signal from the control unit 38.

Thereafter, the noise reduction sound signals of the L and R channels from the gain unit 35 are added to the respective reproduction sound signals SA-L and SA-R which are supplied to the adders 36L and 36R as described above.

The reproduction sounds are output from the speakers 13L and 13R based on the reproduction sound signals SA-L and SA-R to which the noise reduction sound signals are added, so that the above-described noise reduction function is exerted.

The control unit 38 controls the whole noise cancellation unit. For example, the control unit 38 controls the equalizer 39, the noise cancellation unit 34, and the gain unit 35 using the control signal as described above. Further, the control unit 38 can transmit the control signal to the media player 20. Further, the control unit 38 controls the switching of the switches SW1 and SW2.

The memory unit 40 stores information which is referred to when the control unit 38 performs a control process. For example, the memory unit 40 stores information about the filter coefficients of the noise cancellation unit 34 and the equalizer 39 or the like.

The noise cancellation unit 14 of the present example further includes the noise suppression device 1 which has the configuration as described in FIG. 1.

The sound signals SmL and SmR which are converted into digital signals and output from the A/D converters 4L and 4R are supplied to the noise suppression device 1. The noise suppression device 1 performs the configuration and operation described with reference to FIGS. 1 to 6 on the input sound signals SmL and SmR.

Therefore, the output signal Sout, in which the sound from the front direction is boosted as a target sound, such as a conversational sound or the like, and sounds from the other directions are attenuated, is obtained from the noise suppression device 1. The output signal Sout is supplied to the Tn terminals of the switches SW1 and SW2.

Particularly, in the present example, when the control unit 38 detects that a user turns on a monitor mode using the monitor switch 43, the control unit 38 performs control as follows.

If the monitor mode is turned on, the control unit 38 switches the switches SW1 and SW2 to the Tn terminals. Meanwhile, when the monitor mode is turned off, the control unit 38 connects the switches SW1 and SW2 to the Te terminals, and reproduction music is output from the speakers 13L and 13R.

Further, the control unit 38 instructs the media player 20 to stop the reproduction music. Therefore, the media player 20 stops the reproduction music.

When the control unit 38 performs the above-described control, the output signal Sout of the noise suppression device 1 is supplied to the adder 36L and 36R.

Therefore, the noise reduction sound signals from the gain unit 35 and the output signal Sout from the noise suppression device 1 are added by the adders 36L and 36R, and then the resulting signals are supplied to the power amplifiers 42L and 42R. Thereafter, the resulting signals are output from the speakers 13L and 13R as sounds.

These sounds become speaker output sounds in which, for example, a conversational sound from the front direction is clearly audible while surrounding noises are reduced as in the monitor mode.

When the noise suppression device 1 according to the present embodiment is mounted on the NC headphone 10 as described above, the speaker output in which a conversational sound is clearly audible can be realized as a monitor mode operation.

That is, when the NC headphone 10 is used, not only noise but also the sound of a person is reduced. However, with the above-described configuration, surrounding noises can be reduced while the sound of a person who is at the front which is equidistance from the microphones 2L and 2R is not reduced. Therefore, conversation can be performed more pleasantly while wearing the NC headphone 10.

On that basis, in the noise suppression device 1, control on a sound stream is performed by a series filtering process as described above, and the deterioration in sound qualities due to phase mismatching does not occur, so that sound can be output without deterioration in sound quality.

Further, with a low calculation amount and a process using low resources, it is suitable for mounting on a small device such as the noise cancellation unit 14 or the like.

In addition, the whole system can be mounted with low delay.

With respect to the monitor mode function of the NC headphone 10, an actual direct sound and the sound obtained after the process of the noise suppression device 1 is performed are spatially superimposed and then reach the ears of a user. Therefore, if the process delay is large, the sounds are heard as unpleasant echo. However, since the noise suppression device 1 can perform a process with low delay, such an unpleasant echo can be avoided.

3. Examples Applied to Various Kinds of Apparatus and Modified Example

The noise suppression device 1 according to the present embodiment can be applied to further various kinds of apparatus.

For example, it can be considered that the noise suppression device 1 is used for a transmission noise reduction function of a mobile phone.

By mounting the noise suppression device 1 on a headset for a mobile phone, the sound can be transmitted to a counter side while the sound, emitted from the mouth of a user which is at equidistance from the microphones, is not reduced and surrounding noises are reduced.

Of course, the voice communication performed using a Personal Computer (PC) or a television receiver is the same.

Further, an application to a sound recognition front-end may be considered.

Nowadays, a sound recognition function-attached "automatic translation" or the like, which is used in a mobile phone or a small-sized Personal Computer (PC), has reached a workable level which can be ordinarily used, and, hereinafter, it can be considered that such a function can be used outside. On the other hand, when a sound is input outdoors, noises which deteriorate the accuracy of sound recognition may be input in many cases.

Therefore, for example, if a front-end process is performed using the noise suppression device 1 according to the present embodiment in such a way that microphones are attached, for example, on both ends of portable apparatus, an automatic translation system becomes a system with which the user is satisfied.

Further, application as a system for extracting a vocal sound or the like can be considered.

Although an application as the microphone input is described in the above-described embodiment, application to line input or a music file can be considered.

For example, since a vocal sound, a drum sound, or the like is made to be stereotaxically centered in general music, if the noise suppression device 1 according to the present embodiment is applied thereto, the vocal sound and the drum sound can be separated. Thereafter, of course, if bands are divided, the separation of the vocal sound and the drum sound can be performed.

A modified example of the embodiment can be variously considered.

Figure 9:
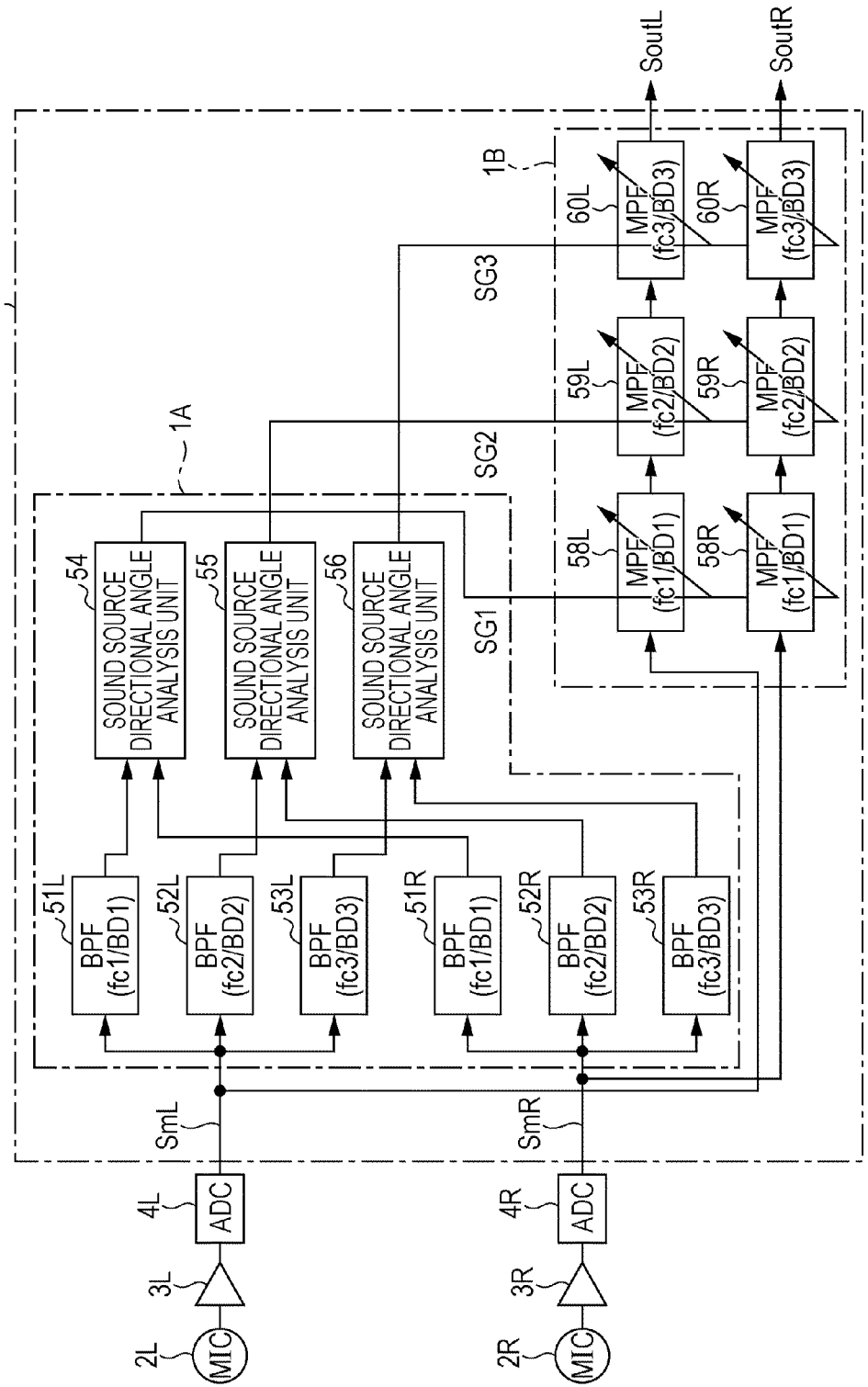
FIG. 9 is a block diagram of a noise suppression device according to another embodiment.

FIG. 9 shows a modified example of the configuration of the noise suppression device 1. This is an example in which a group of two independent systems of series filters is provided in an L channel and an R channel.

That is, the sound signal SmL of the L channel is input to series filter systems of MPFs 58L, 59L, and 60L. The sound signal SmR of the R channel is input to series filter systems of MPFs 58R, 59R, and 60R.

The filter characteristics of the MPFs 58L and 58R are variably controlled using a control signal SG1 based on the determination of a sound source directional angle analysis unit 54.

The filter characteristics of the MPFs 59L and 59R are variably controlled using a control signal SG2 based on the determination of a sound source directional angle analysis unit 55.

The filter characteristics of the MPFs 60L and 60R are variably controlled using a control signal SG3 based on the determination of a sound source directional angle analysis unit 56.

That is, the modified example is a configuration example in which the operation thereof is the same as in the configuration of FIG. 1 but output signals SoutL and SoutR of the two L and R channels are output as signals obtained after a process is performed.

The noise suppression device 1 may be applied to various types of apparatus with such a configuration.

Further, although not shown in the drawing, sound source direction determination to be performed on microphone input sounds of three or more channels can be considered.

In such a case, sound signals on which a series filter processes is performed may be combined into a single channel or two channels as shown in FIG. 8. Further, the output signals Souts of three or more channels may be obtained in such a way that the series filter process is performed on each of the microphone input sound signals of three or more channels, independently.

Further, it may be considered that the sound signal of a single channel is supplied from among the input sound signals of a plurality of channels when a single series filter system is provided. For example, it may be a configuration in which only the sound signal SmL is supplied to the filter group of the MPFs 58, 59, and 60 and the output signal Sout is obtained when the single series filter system (MPFs 58, 59, and 60) is provided as shown in FIG. 1.

Further, it is proper that the number of bands divided by the band pass filters and the bandwidth of a single band are set according to the apparatus to be mounted, a target sound, a usage form, or the like. The number of MPFs connected in series is basically set according to the number of bands divided by the band pass filters.

Further, although the process of boosting the sound from the front direction or the back direction as a target sound is described in the embodiment, for example, a process of boosting a sound from the right side as a target sound and reducing sounds from the other directions can be performed. For example, when the angle θ corresponds to the right area as shown in FIG. 4B, a boosting process may be performed on the MPF corresponding to the band of the target sound, and an attenuating process may be performed on the MPFs corresponding to the bands in which the angle θ corresponds to the center area and the left area.

That is, the sound source direction of a target sound can be set using any method.

Further, although the noise suppression device 1 performs the digital data process using the A/D converters 4L and 4R in the embodiment as shown in FIG. 1, the filtering process performed by the MPFs 58, 59, and 60 or the band division performed by the band pass filters may be performed using an analog signal process.

The present disclosure contains subject matter related to that disclosed in Japanese Priority Patent Application JP 2010-125502 filed in the Japan patent office on Jun. 1, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound signal processing apparatus comprising:
   a sound source direction determination unit that determines sound source directions with respect to sound signals of a plurality of channels for respective first to n-th bands; and
   a filter processing unit that includes first to n-th filters which are connected in series and configured to boost or attenuate the sound signals with respect to the first to n-th bands,
   wherein the respective first to n-th filters perform boosting or attenuation based on the sound source directions of the first to n-th bands which are determined by the sound source direction determination unit;
   wherein the sound source direction determination unit includes first to n-th sound source directional angle analysis units corresponding to the first to n-th bands,
   wherein each of the first to n-th sound source directional angle analysis units has one-to-one correspondence with each of the first to n-th filters, and regards the corresponding filters as control targets for a boosting or attenuating process, wherein each of the first to n-th sound source directional angle analysis units allows the filter to be controlled to perform the boosting process when a sound source direction of a corresponding band is determined as a direction included in a predetermined angle range, and allows the filter to be controlled to perform the attenuating process when a sound source direction angle of the corresponding band is not determined as a direction included in the predetermined angle range; and wherein each of the first to n-th sound source directional angle analysis units allows the filter to be controlled to perform the attenuating process when the sound source direction is determined to be in a dispersion state.

2. The sound signal processing apparatus according to claim 1, wherein each of the first to n-th sound source directional angle analysis units determines the sound source direction with respect to the corresponding band based on energy subtraction of the sound signals of the respective channels.

3. The sound signal processing apparatus according to claim 1, wherein each of the first to n-th filters of the filter processing unit, which are connected in series, receives a sound signal with which the sound signals of the plurality of channels are combined.

4. The sound signal processing apparatus according to claim 1, wherein each of the first to n-th filters of the filter processing unit, which are connected in series, receives a sound signal of one of the plurality of channels.

* * * * *